No. 769,252. PATENTED SEPT. 6, 1904.
H. C. COWEN.
SPLIT SET COLLAR.
APPLICATION FILED NOV. 17, 1902.
NO MODEL.
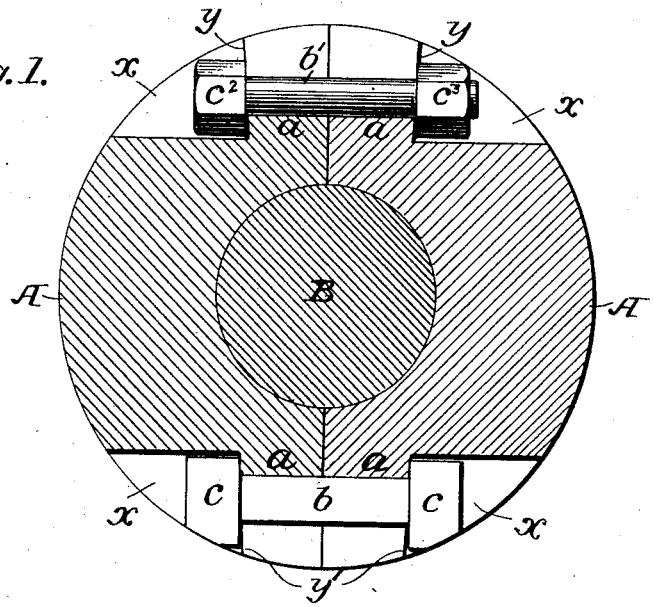
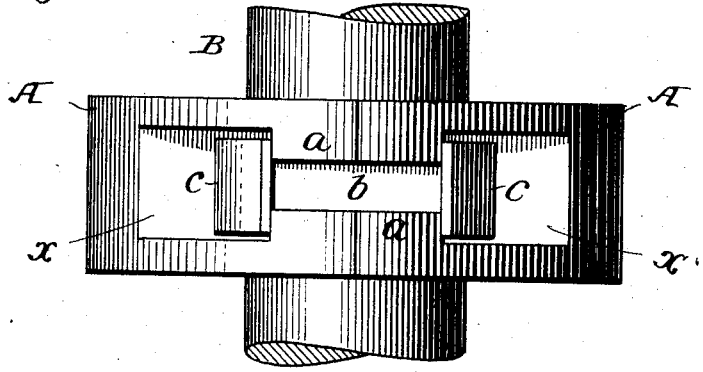
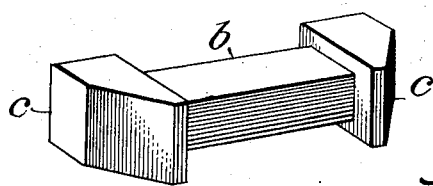
Witnesses
Inventor
Herman C. Cowen
By Foster & Freeman
Attorneys No. 769,252.

Patented September 6, 1904.

UNITED STATES PATENT OFFICE.

HERMAN C. COWEN, OF SMITHS LANDING, NEW YORK.

SPLIT SET-COLLAR.

SPECIFICATION forming part of Letters Patent No. 769,252, dated September 6, 1904.

Application filed November 17, 1902. Serial No. 131,756. (No model.)

*To all whom it may concern:*

Be it known that I, HERMAN C. COWEN, a citizen of the United States, residing at Smiths Landing, in the county of Greene and State of New York, have invented certain new and useful Improvements in Split Set-Collars, of which the following is a specification.

My invention relates to set-collars—that is, to collars of any character which it may be required to set upon a shaft or for use in couplings or other purposes and where it is necessary to have the collar in sections which must be united; and my invention consists in forming the collars with abutments having slots extending to the peripheries of the collars whereby to permit the placing of the retaining pieces or keys laterally in position, as fully set forth hereinafter, and as illustrated in the accompanying drawings, in which—

Figure 1 is a section of my improved collar; Fig. 2, an edge view, and Fig. 3 a perspective view of the key.

The sections A A of the collar may be of any desired size and shape and number, two being shown, each section having two recesses $x$, which are formed by cutting away the collar, so as to leave abutments $a$, each perforated for the passage of a key or bolt $b$ or $b'$, the perforations, however, in this case being in the form of slots open at the circumference of the collars instead of in the form of transverse openings for the passage of bolts, as usual. The sections are put together so that the abutments at each side meet each other, as shown, thereby forming a continuous outer slot, into which the stem $b$ of a bolt may be passed laterally, the heads $c$ $c$ of the bolt or key taking their inner bearings against the outer faces of the abutments, as shown. By this means it is possible in many instances to place the keys or bolts in place within a contracted space where otherwise it would be extremely difficult to adjust them.

The keys or bolts may be formed in any suitable manner—as, for instance, as shown at the bottom of Fig. 1 and in Figs. 2 and 3, of a rectangular (or round) bar or stem $b$ and rectangular heads $c$ $c$—and this key may be driven into place and may serve to contract the sections upon a shaft B by having the outer faces $y$ $y$ of the abutments slightly inclined toward each other or converging outwardly, as shown at the bottom in Fig. 1. In other cases the key may be in the form of any ordinary bolt $b'$, with a head $c^2$ and nut $c^3$, as shown at the upper part of Fig. 1, the same, however, being introduced laterally instead of by turning the bolt or the nuts, as usual, after passing the stem of the bolt through a transverse perforation in the abutment. Whatever the construction, greater compression of the sections against the shaft may be secured by making the key so as to fit closely to the abutment and then expanding it by heating the same and placing it in its position where it will by its contraction be brought to bear with great pressure upon the abutments. In some cases the faces $y'$ $y'$ of the abutments may incline inward, as shown at the top in Fig. 1, thereby tending to prevent the keys from being thrown outward by centrifugal action in case the shaft should rotate at a speed tending to produce such action.

It will be evident that the sections A A may be sections of an adjustable collar to be secured on a shaft in any desired position, or they may be sections of a clutch or clamp or union-piece of any desired character.

It will be seen that when an ordinary bolt is used for a key the sides of the slot $x$ will prevent the turning of the head and stem of the bolt or the nut, thereby serving to retain the parts in place without the use of a locknut of any character.

Without limiting myself to the precise construction and arrangement of parts shown, I claim as my invention—

1. A split collar consisting of two similar independent sections each with two recesses $x$, $x$ and two abutments $a$ $a$ having radial recesses open at the outer ends, combined with keys having stems extending through said radial recesses and with heads bearing against the abutments of both sections, substantially as set forth.

2. The combination of the sections A A each having recesses $x$, and abutments $a$ with radial recesses and outer faces $y'$ $y'$, the two faces $y'$ $y'$ of the opposite sections converging, keys each having a stem extending through the coinciding recesses, and with heads bearing against the outer faces of both abutments, substantially as set forth.

In testimony whereof I have signed my name to this specification in the presence of two subscribing witnesses.

HERMAN C. COWEN.

Witnesses:
  J. F. HILBERT,
  JNO. W. CUMMING, Jr.